United States Patent
Park et al.

(10) Patent No.: US 7,821,185 B2
(45) Date of Patent: Oct. 26, 2010

(54) DISPLAY FILTER AND DISPLAY APPARATUS HAVING THE SAME

(75) Inventors: Dae Chul Park, Suwon-si (KR); Jae Young Choi, Seoul (KR); Tae Soon Park, Suwon-si (KR); Jin Woo Yeo, Seoul (KR); Jin Seo, Daejeon (KR)

(73) Assignee: Samsung Corning Precision Glass Co., Ltd., Gumi (KR)

( * ) Notice: Subject to any disclaimer, the term of this patent is extended or adjusted under 35 U.S.C. 154(b) by 360 days.

(21) Appl. No.: 11/797,127

(22) Filed: May 1, 2007

(65) Prior Publication Data

US 2007/0257591 A1    Nov. 8, 2007

(30) Foreign Application Priority Data

May 3, 2006    (KR) ...................... 10-2006-0040178

(51) Int. Cl.
*H01J 5/16* (2006.01)

(52) U.S. Cl. .................... 313/112; 313/582; 428/690

(58) Field of Classification Search ............... 313/112, 313/582–587; 353/69; 428/141, 690
See application file for complete search history.

(56) References Cited

U.S. PATENT DOCUMENTS

| | | | |
|---|---|---|---|
| 5,939,826 A | 8/1999 | Ohsawa et al. | |
| 6,262,364 B1 | 7/2001 | Yoshikawa et al. | |
| 6,576,352 B2 | 6/2003 | Hirai | |
| 6,657,387 B1 * | 12/2003 | Yoo | ............................ 313/587 |
| 6,905,215 B2 * | 6/2005 | Segler et al. | ................... 353/69 |
| 2002/0036733 A1 | 3/2002 | Park et al. | |
| 2003/0046839 A1 | 3/2003 | Oda et al. | |
| 2004/0051447 A1 | 3/2004 | Okinaka et al. | |
| 2004/0169831 A1 * | 9/2004 | Uehara et al. | ................ 353/122 |
| 2004/0239248 A1 * | 12/2004 | Chang et al. | ................. 313/582 |
| 2004/0253413 A1 | 12/2004 | Baba et al. | |
| 2004/0263039 A1 | 12/2004 | Takei et al. | |
| 2005/0162087 A1 | 7/2005 | Kim et al. | |
| 2005/0225239 A1 * | 10/2005 | Min et al. | .................... 313/582 |
| 2005/0237611 A1 | 10/2005 | Osawa et al. | |

(Continued)

FOREIGN PATENT DOCUMENTS

CN    1337589    2/2002

(Continued)

OTHER PUBLICATIONS

English Translation of JP2003-58071.*

(Continued)

*Primary Examiner*—Nimeshkumar D Patel
*Assistant Examiner*—Mary Ellen Bowman
(74) *Attorney, Agent, or Firm*—McDermott Will & Emery LLP

(57) ABSTRACT

A display filter and a display apparatus including the display filter, which can increase a contrast ratio in a bright room, and prevent a moiré phenomenon and a Newton's ring phenomenon, are provided. The display filter includes: a filter base; an external light-shielding layer comprising a base substrate including a transparent resin and light-shielding patterns spaced apart on a surface of the base substrate at predetermined intervals; and a diffusion layer diffusing a light provided from a panel assembly.

12 Claims, 13 Drawing Sheets

U.S. PATENT DOCUMENTS

2006/0194020 A1    8/2006    Naito et al.

FOREIGN PATENT DOCUMENTS

| CN | 1574164 | | 2/2005 |
| CN | 1610045 | A | 4/2005 |
| CN | 1681065 | | 10/2005 |
| CN | 1701276 | A | 11/2005 |
| JP | 8-138559 | | 5/1996 |
| JP | 9-247582 | | 9/1997 |
| JP | 10-214567 | | 8/1998 |
| JP | 2000-114772 | | 4/2000 |
| JP | 2000-323049 | | 11/2000 |
| JP | 2002-533899 | | 10/2002 |
| JP | 2003-58071 | | 2/2003 |
| JP | 2003058071 | A * | 2/2003 |
| JP | 2004-012918 | | 1/2004 |
| JP | 2004-286996 | | 10/2004 |
| WO | WO 00/39830 | | 7/2000 |

OTHER PUBLICATIONS

Korean Office Action issued in corresponding Korean Patent Application No. KR 10-2006-0040178, dated Feb. 10, 2007.
Chinese Office Action, w/ English translation thereof, issued in Chinese Patent Application No. CN 2007101030165 dated Apr. 17, 2009.
Notice of Allowance dated Apr. 29, 2010, U.S. Appl. No. 11/321,517.

* cited by examiner

DISPLAY FILTER AND DISPLAY APPARATUS HAVING THE SAME

CROSS-REFERENCE TO RELATED APPLICATION

This application claims the benefit of Korean Patent Application No. 10-2006-0040178, filed on May 3, 2006, in the Korean Intellectual Property Office, the disclosure of which is incorporated herein by reference.

BACKGROUND OF THE INVENTION

1. Field of the Invention

The present invention relates to a display filter and a display apparatus including the display filter, and more particularly, to a display filter and a display apparatus including the display filter, which can increase a contrast ratio in a bright room, and prevent a moiré phenomenon and a Newton's ring phenomenon.

2. Description of Related Art

As modern society becomes more information oriented, technology of parts and devices related to image displays is remarkably advancing, and these parts and devices are becoming widespread. Display apparatuses utilizing parts and devices related to photoelectronics are becoming significantly widespread and used for television apparatuses, monitor apparatuses of personal computers, and the like. Also, display apparatuses are becoming both larger and thinner.

Plasma display panel (PDP) apparatuses are generally gaining popularity as next-generation display apparatuses to simultaneously satisfy a trend of becoming larger, and of becoming thinner, when compared with cathode-ray tubes (CRTs) representing existing display apparatuses. The PDP apparatuses display images using a gas discharge phenomenon, and exhibit superior display characteristics such as display resolution, brightness, contrast ratio, an afterimage, a viewing angle, and the like. Also, since the PDP apparatuses are generally seen as having the most appropriate characteristics for future high-quality digital televisions due to thin luminous display apparatuses of which enlargement is simpler than any other display apparatus, the PDP apparatuses are gaining popularity as display apparatuses and are replacing CRTs.

The PDP apparatus generates a gas discharge between electrodes by a direct current (DC) voltage or an alternating current (AC) voltage which are supplied to the electrodes. Here, ultraviolet light is generated. Then, a phosphor is exited by ultraviolet light, thereby emitting light.

However, the PDP apparatus has a defect in that an amount of emitted electromagnetic (EM) radiation and near infrared (NI) radiation with respect to a driving characteristic is great, surface reflectivity of the phosphor is great, and color purity due to orange light emitted from helium (He), or xenon (Xe) used as a sealing gas is lower than the CRT.

Also, EM radiation and NI radiation generated in the PDP apparatus may have harmful effects on human bodies, and cause sensitive equipment such as wireless telephones, remote controls, and the like, to malfunction. Therefore, in order to use the PDP apparatus, it is required to prevent emission of EM radiation and NI radiation emitted from the PDP apparatus from increasing to more than a predetermined level. PDP filters having functions such as an EM radiation-shielding function, an NI radiation-shielding function, a surface antiglare function, enhancement of color purity, and the like, are used for EM radiation-shielding and NI radiation-shielding while simultaneously reducing reflected light, and enhancing color purity.

The PDP apparatus is made of a panel assembly including a discharge cell where a gas discharge phenomenon occurs, and a PDP filter for EM radiation-shielding and NI radiation-shielding. Since the PDP filter is equipped in a front unit of the panel assembly, transparency is required to simultaneously emit light and perform shielding functions.

External light may enter the panel assembly passing through the PDP filter in a condition that an outer surface is bright, that is, in a bright room condition with the PDP apparatus according to the conventional art. Accordingly, an overlapping between incident light generated in the discharge cell of the panel assembly, and the external light entered passing through the PDP filter from the outer surface occurs. Accordingly, a contrast ratio decreases in the bright room condition, and therefore screen display capacity of the PDP apparatus is deteriorated.

Also, the PDP filter according to the conventional art includes a mesh pattern for EM radiation-shielding or another functional periodic pattern. When the periodic pattern is reflected on a front substrate of the panel assembly, a moiré phenomenon occurs due to mutual interference between original patterns and patterns by reflected light. Also, when a distance between the PDP filter and the front substrate of the panel assembly is different, a Newton's ring phenomenon occurs. Screen display capacity of the PDP apparatus is deteriorated due to noise such as moiré or Newton's ring.

BRIEF SUMMARY

An aspect of the present invention provides a display filter and a display apparatus including the display filter, which can increase a contrast ratio in a bright room, and prevent a moiré phenomenon and a Newton's ring phenomenon.

An aspect of the present invention also provides a display apparatus including a display filter.

Technical solutions of the present invention are not limited to the above technical solutions, and other technical solutions which are not described would be definitely appreciated from a description below by those skilled in the art.

According to an aspect of the present invention, there is provided a display filter including: a filter base; an external light-shielding layer including a base substrate including a transparent resin and light-shielding patterns spaced apart on a surface of the base substrate at predetermined intervals; and a diffusion layer diffusing a light provided from a panel assembly.

According to another aspect of the present invention, there is provided a display apparatus including: a panel assembly comprising a transparent front substrate and a rear substrate being coupled corresponding to each other, and a plurality of cells between the front substrate and the rear substrate; and the display filter located corresponding to the front substrate of the panel assembly.

According to still another aspect of the present invention, there is provided a display apparatus including: a panel assembly comprising a transparent front substrate and a rear substrate being coupled corresponding to each other and a plurality of cells between the front substrate and the rear substrate; and the display filter located corresponding to the front substrate of the panel assembly, wherein a surface of the front substrate corresponding to the display filter is an antiglare-processed surface.

Details of other exemplary embodiments are included in brief description of the drawings.

Advantages and features of the present invention and methods of performing the advantages and features may be apparent with reference to appended drawings and following exemplary embodiments described in detail. However, the present invention is not limited to the exemplary embodiments disclosed below, and may be realized in various forms. The exemplary embodiments are provided to completely disclose the present invention and fully inform those skilled in the art of categories of the invention, and the present invention is defined by the categories of claims. Identical reference numerals refer to identical elements throughout a specification.

The display apparatus used for the present invention can be variously applied to PDP apparatuses realizing a red color, a green color, and a blue color (RGB) with lattice-patterned pixels, organic light emitting diode (OLED) apparatuses, liquid crystal display (LCD) apparatuses, field emission display (FED) apparatuses, and the like. The present invention is described by using the PDP apparatus and the PDP filter used for the PDP apparatus for convenience of description, but the present invention is not limited thereto and can be applied to the above various display apparatuses and the display filters used for the display apparatuses.

In an aspect of the present invention, the light-shielding pattern is a pattern for external light-shielding, and may correspond to any one of a black stripe pattern, a black matrix pattern, a black wave pattern, and the like. Also, the light-shielding pattern formed on a predetermined base substrate may have a wedge-typed section, a flat-typed section, and the like.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF EMBODIMENTS

Figure 1:
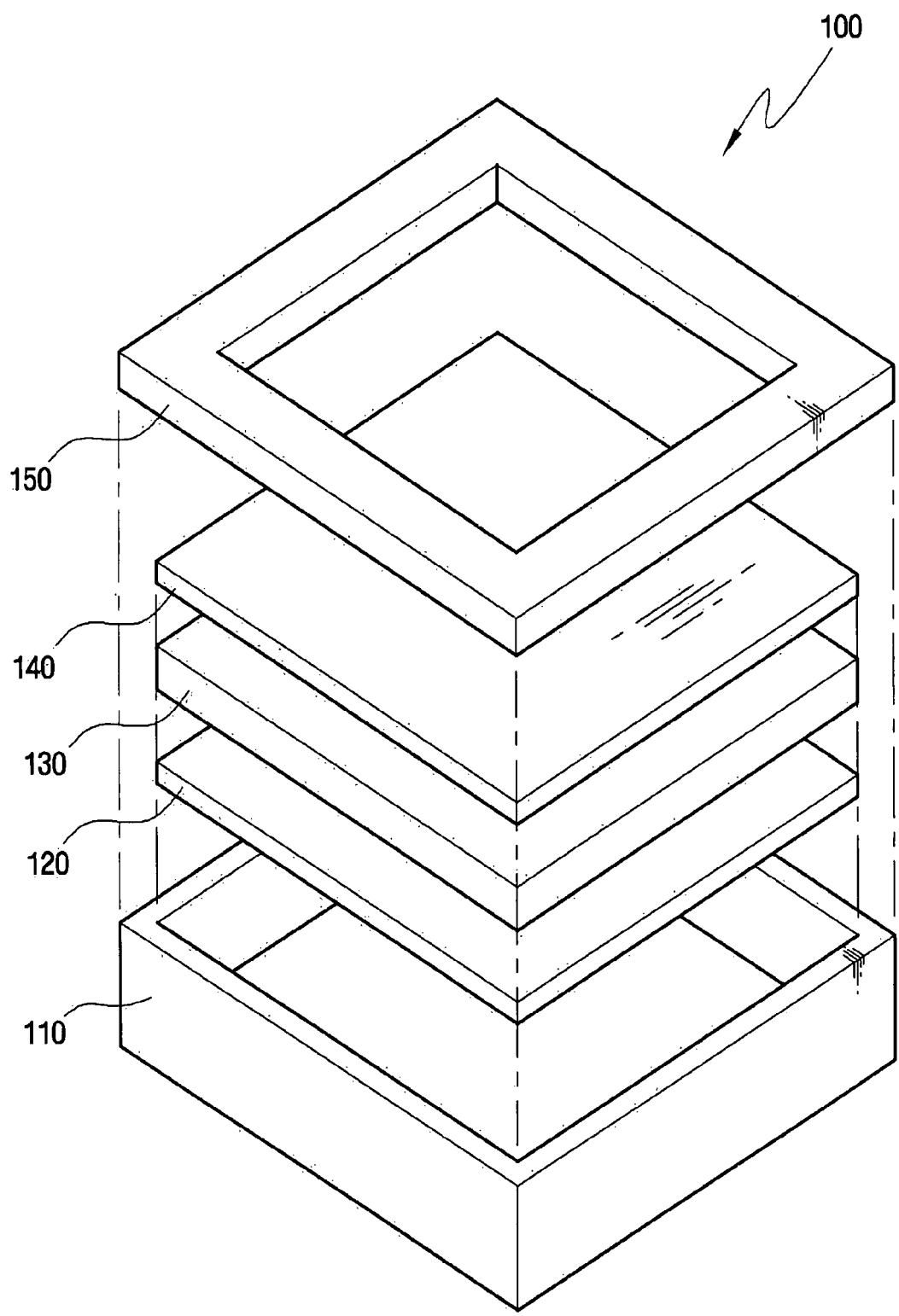
FIG. 1 is an exploded perspective view illustrating a plasma display panel (PDP) apparatus according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is an exploded perspective view illustrating a plasma display panel (PDP) apparatus according to an exemplary embodiment of the present invention. A structure of the PDP apparatus 100 according to the exemplary embodiment of the present invention includes a case 110, a cover 150 covering an upper part of the case 110, a driving circuit board 120 received in the case 110, a panel assembly 130 including a discharge cell where a gas discharge phenomenon occurs, and a PDP filter 140, as illustrated in FIG. 1. The PDP filter 140 includes a conductive layer including a material with high conductivity on a transparent substrate, and the conductive layer is grounded to the case 110 via the cover 150. Specifically, electromagnetic (EM) radiation generated from the panel assembly 130 is shielded by the cover 150 and the case 110 which are grounded using the conductive layer of the PDP filter 140, before reaching a viewer.

Hereinafter, the PDP filter 140 for shielding EM radiation, near infrared (NI) radiation, external light, and the like is first described with reference to FIGS. 2 and 3, and the PDP apparatus 100 including the PDP filter 140 and the panel assembly 130 is then described.

Figure 2:
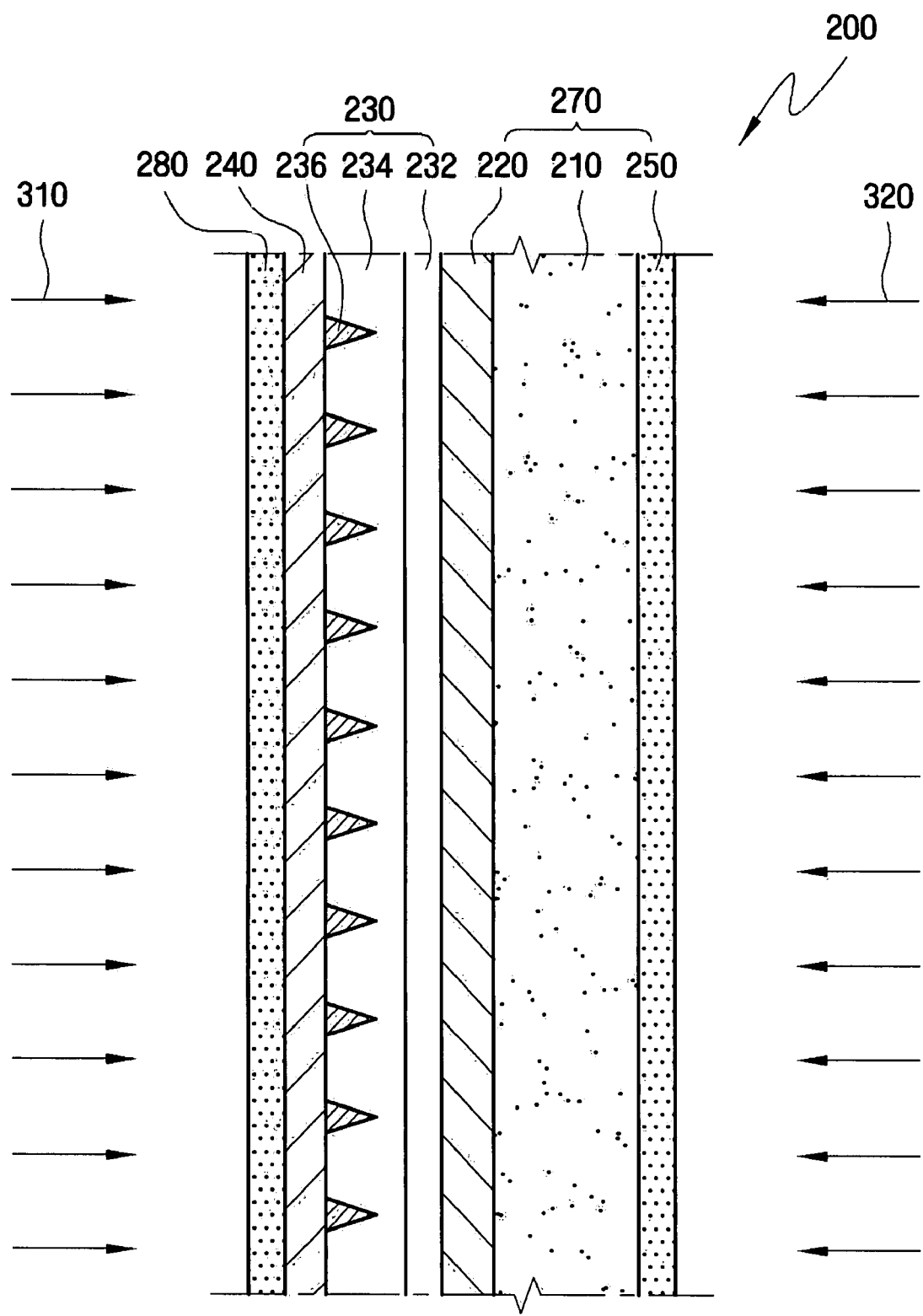
FIG. 2 is a sectional view illustrating a PDP filter according to an exemplary embodiment of the present invention.

FIG. 2 is a sectional view illustrating a PDP filter according to an exemplary embodiment of the present invention.

As illustrated in FIG. 2, the PDP filter 200 according to the present exemplary embodiment includes a filter base 270 and an external light-shielding layer 230. The filter base 270 includes a transparent substrate 210, and layers which have various shielding functions, and the like, and are formed on the transparent substrate 210.

Here, the filter base 270 is formed by stacking the transparent substrate 210, an EM radiation-shielding layer 220, or an antireflective layer 250 regardless of order. Hereinafter, layers corresponding to an EM radiation-shielding function, and an antireflection function are described as separate layers in the present exemplary embodiment, but the present invention is not limited thereto. Specifically, the filter base 270 according to the present exemplary embodiment may include at least one layer, and each layer may have at least one function from the group consisting of the EM radiation-shielding function, and the antireflection function. Also, the filter base 270 may either collectively have the EM radiation-shielding function and the antireflection function, or have merely one function of the EM radiation-shielding function, and the antireflection function.

The external light-shielding layer 230 is disposed on a surface of the filter base 270. The external light-shielding layer 230 of the exemplary embodiment illustrated in FIG. 2 is disposed on a surface of the filter base 270, that is, an opposite surface of a viewer position when the PDP filter 200 is installed in the PDP apparatus, but the present invention is not limited thereto, and the same functions and effects can be also obtained when the external light-shielding layer 230 is disposed on another surface of the filter base 270.

The external light-shielding layer 230 includes a supporter 232, a base substrate 234 formed on a surface of the supporter 232, and a light-shielding pattern 236 formed in the base substrate 234. The light-shielding pattern 236 shields the panel assembly from external light 320 entering from an outer surface of the PDP filter. The light-shielding pattern 236 in the present exemplary embodiment may include a wedge-shaped black stripe form.

Here, the base substrate 234 where the light-shielding pattern 236 is formed may be directly formed in the filter base 270, but the base substrate 234 may be combined with the filter base 270 after forming the base substrate 234 on the supporter 232, as illustrated in FIG. 2. The supporter 232 supports the base substrate 234 where the light-shielding pattern 236 is formed. The base substrate 234 and the surface of the filter base 270 are combined via the supporter 232 in the exemplary embodiment illustrated in FIG. 2, but the present invention is not limited thereto. Specifically, since the supporter 232 has a purpose of supporting the base substrate 234, the base substrate 234 and the filter base 270 may be directly combined when the external light-shielding layer 230 is disposed on another surface of the filter base 270.

In the exemplary embodiment of the present invention, the supporter 232 is preferably a transparent resin film transparent to the ultraviolet light. A polyethylene terephthalate (PET), a polycarbonate (PC), a polyvinyl chloride (PVC), and the like may be used for a material of the supporter 232. Also, a layer having a characteristic function of a filter such as the antireflective layer 250, the color correction layer 240, the EM radiation-shielding layer 220, and the like may be used for the supporter 232.

The light-shielding pattern 236 has a section having a wedge-shape, and is formed on the surface of the base substrate 234 corresponding to the panel assembly (not illustrated). Also, the light-shielding pattern 236 prevents the external light 320 from entering an inside of the panel assembly The base substrate 234 is made of an ultraviolet light-curable resin, and the light-shielding pattern 236 may be made of black inorganic/organic materials capable of absorbing light, and a metal. In particular, since electric conductivity is high, that is, electric resistance is low in the case of using the metal, the electric resistance according to concentration of the metal powder may be controlled when forming the light-shielding pattern 236 by adding metal powder. Accordingly, the light-shielding pattern 236 may perform the EM radiation-shielding function. Furthermore, in the case of using a surface-blackened metal or a black metal, the light-shielding pattern 236 may efficiently perform the external light-shielding function and the EM radiation-shielding function. Also, the ultraviolet light-curable resin including carbon may be used for the light-shielding pattern 236.

The light-shielding pattern 236 of the present invention may be formed by a roll molding method, a heat press method of using a thermoplastic resin, an injection molding method in which a thermoplastic or thermo-curable resin is filled into the base substrate 234 in which an opposite shape to the light-shielding pattern 236 is totally reflected, and the like. Also, when the ultraviolet light-curable resin forming the base substrate 234 has the antireflection function, the EM radiation-shielding function, a color calibration function, or any combination thereof, the external light-shielding layer 230 may additionally perform the above functions.

The light-shielding pattern 236 included in the external light-shielding layer 230 absorbs the external light 320, prevents the external light 320 from entering the panel assembly, and totally reflects the incident light 310 from the panel assembly to the viewer. Accordingly, a high transmittance with respect to visible light, and a high contrast ratio may be obtained.

The PDP apparatus preferably has the high transmittance with respect to visible light, and the high contrast ratio. Here, the contrast ratio may be shown as Equation 1.

$$\text{contrast ratio} = \frac{\text{brightness of (white light + reflected light)}}{\text{brightness of (black light + reflected light)}} \quad [\text{Equation 1}]$$

When the light emitted from the panel assembly is allowed to pass through the PDP filter without filtration to increase the transmittance of the PDP apparatus, both the brightness of white light and the brightness of black light are increased. Therefore, when the brightness of the PDP apparatus is increased, the entire contrast ratio is relatively decreased. A conventional PDP apparatus adopts a method of using a PDP filter including a black colorant-containing color correction film, and increasing the contrast ratio instead of reducing the transmittance of the PDP filter to a certain degree. To obtain the contrast ratio of about 120:1 in the case of using the conventional PDP apparatus, a visible light transmittance is required to be reduced to a range from about 40% to about 45%.

The PDP filter 200 of the present invention uses the light-shielding pattern 236 absorbing light instead of using the black colorant-containing color correction film. Here, the light-shielding pattern 236 partially absorbs the incident light 310 emitted from the panel assembly, and reduces the brightness of white light and black light by a predetermined portion, thereby increasing the contrast ratio. Also, according to Equation 1, the contrast ratio corresponds to a function with respect to the brightness of reflected light, and reflected light includes light reflected after the external light 320 enters the panel assembly. Here, since the external light 320 is directly absorbed in the light-shielding pattern 236, or is indirectly absorbed in the light-shielding pattern 236, although reflection occurs in the panel assembly, the brightness of reflected light may be reduced. Accordingly, although identical reflected light with respect to white light and black light is generated, the brightness of reflected light in a denominator of Equation 1 is reduced. Therefore, the contrast ratio may be increased.

When an area ratio of the bottom surface of the light-shielding pattern 236 to the surface of the base substrate 234 corresponds to about 20% to about 50%, the maximum contrast ratio may be obtained by the minimum transmittance loss. More preferably, greater effects can be obtained, when the area ratio of the bottom surface of the light-shielding pattern 236 to the surface of the base substrate 234 corresponds to about 25% to about 35%. The PDP apparatus using the PDP filter 200 including the external light-shielding layer 230 may obtain a contrast ratio greater than or equal to about 250:1, when the visible light transmittance is maintained to be greater than or equal to about 50%.

Also, the external light-shielding layer 230 has the transmittance greater than or equal to about 70% in a visible spectrum. The incident light 310 from the panel assembly is mostly incident to a vertical direction with respect to the external light-shielding layer 230. Also, a portion of the incident light 310 is absorbed in the light-shielding pattern 236. However, most portion of the incident light 310 is directly transmitted through the base substrate 234, and therefore this causes the transmittance of the PDP apparatus to be increased.

As described above, the wedge-shaped black stripe form may be used for the light-shielding pattern 236, however, the present invention is not limited thereto. Specifically, the light-shielding pattern 236 absorbs the external light, prevents the external light from entering the panel assembly, and reflects the incident light 310 from the panel assembly to the viewer. Accordingly, the light-shielding pattern 236 having various forms in which a high transmittance with respect to visible light, and in which a high contrast ratio may be obtained, may be used. For example, the light-shielding pattern 236 corresponds to any one of a black stripe form, a black matrix form, a black wave form, and the like. Also, the light-shielding pattern 236 may be formed on a predetermined base substrate, and have a wedge-typed section, a flat-typed section, and the like. Hereinafter, the present invention is described using the light-shielding pattern 236 having a wedge-shaped black stripe form for convenience of description.

The filter base 270 has a multi-layered structure of the EM radiation-shielding layer 220 formed on the surface of the transparent substrate 210, and the antireflective layer 250 formed on the other surface of the transparent substrate 210, and the like. The present invention is not limited to the above-described stacking order, and the filter base 270 may have the multi-layered structure regardless of a stacking order of the transparent substrate 210, the EM radiation-shielding layer 220, or the antireflective layer 250.

Here, the transparent substrate 210 is generally produced using a tempered glass or a semi-tempered glass which is about 2.0 mm to about 3.5 mm thick, or a transparent plastic material such as acrylic. Glass has a drawback that it is difficult to produce a lightweight filter due to specific gravity corresponding to about 2.6 when producing a filter, and the gross weight of an entire set increases due to an increasing thickness of the glass when installing in a plasma display panel set. However, glass significantly enhances safety against destruction. Also, the transparent substrate 210 may be excluded depending on a type of the filter base 270.

In the present exemplary embodiment, the transparent substrate 210 may include an inorganic compound such as glass, quartz, and the like, and transparent organic polymers.

Acrylic or polycarbonate is generally used for the transparent substrate 210 formed by the member of the organic polymer, however, the present invention is not limited to the above exemplary embodiments. The transparent substrate 210 preferably has great transparency and thermal resistance. Also, the transparent substrate 210 may include a polymeric article or stacked body of the polymeric articles. A transmittance with respect to visible light is preferably greater than about 80% concerning transparency of the transparent substrate 210, and transition temperature with respect to glass is preferably higher than about 50° C. concerning thermal resistance. It is required that the polymer used for the transparent substrate 210 is transparent in a visible wavelength range. Also, there are polyethylene terephthalate (PET), polysulfone (PS), polyether sulfone (PES), polystyrene, polyethylene naphtalate, polyarylate, polyether ether ketone (PEEK), polycarbonate (PC), polypropylene (PP), polyimide, triacetylcellulose (TAC), polymethylmethacrylate (PMMA), and the like as a specific example of the polymer used for the transparent 210, however, the polymer used for the transparent 210 is not limited thereto. The transparent substrate 210 preferably includes PET in aspects of price, thermal resistance, and transparency.

Also, it is required to cover a display surface with a highly conductive material to shield EM radiation. A multi-layered transparent conductive film stacking a conductive mesh film, a metal thin film, and a transparent thin film having a high refractive index may be used for the EM radiation-shielding layer 220 according to the present exemplary embodiment. In the present exemplary embodiment, the EM radiation-shielding layer 220 is formed on the surface of the transparent substrate 210, that is, a surface towards the panel assembly, but the present invention is not limited to the above disposition.

Here, a grounded metal mesh, a synthetic resin, or a mesh of a metal fiber covered with a metal may be generally used for the conductive mesh film. A metal having processibility and high electric conductivity, for example, copper, chrome, nickel, silver, molybdenum, tungsten, aluminum, and the like, may be used for the metal configuring the conductive mesh film.

Also, the transparent thin film having the high refractive index such as indium tin oxide (ITO) may be used for the multi-layered transparent conductive film in order to have the EM radiation-shielding effect. There are a multi-layered thin film alternately stacking the metal thin film such as gold, silver, copper, platinum, and palladium, and the transparent thin film having the high refractive index such as indium oxide, stannic oxide, zinc oxide, and the like as the multi-layered transparent conductive film.

The metal thin film is a thin film layer formed with silver, or an alloy including silver. Since silver and the alloy including silver has high conductivity, high reflectivity with respect to infrared light, and high transmittance with respect to visible light when stacking multi-layers, silver is preferably used. However, since silver has low chemical and physical stability, and is deteriorated by pollutants of a surrounding environment, vapor, heat, light, and the like, the alloy including silver and at least one other metal which is stable with respect to the surrounding environment such as gold, platinum, palladium, copper, indium, tin, and the like, may be also used.

Also, the transparent thin film having the high refractive index has transparency with respect to visible light, and has an effect of preventing the visible light from being reflected by the metal thin film due to a refractive index difference from the metal thin film. Specific materials forming the transparent thin film having the high refractive index are an oxide such as indium, titanium, zirconium, bismuth, tin, zinc, antimony, tantalum, cerium, neodymium, lanthanum, thorium, magnesium, potassium, and the like, combinations thereof, zinc sulfide, and the like.

Although it is also not illustrated, the filter base 270 according to the present exemplary embodiment may separately include an NI radiation-shielding layer. The NI radiation-shielding layer is generated from the panel assembly, and shields the strong NI radiation causing electronic devices such as wireless phones, remote controls, and the like, to malfunction.

There is an effect that the multi-layered transparent conductive film shields NI radiation, when the multi-layered transparent conductive film stacking the metal thin film and the transparent thin film having the high refractive index is used for the EM radiation-shielding layer 220 according to the present exemplary embodiment. Accordingly, two functions corresponding to an NI radiation-shielding function and the EM radiation-shielding function may be simply performed by the EM radiation-shielding layer 220 without separately forming the NI radiation-shielding layer. Also, the NI radiation-shielding layer described as follows may be separately formed in this case.

When the conductive mesh film is used for the EM radiation-shielding layer 220 in the present exemplary embodiment, a polymeric resin, including a colorant absorbing NI radiation which absorbs a wavelength of a NI radiation range, is used to shield NI radiation emitted from the panel assembly. For example, an organic dye of various materials such as cyanine, anthraquinone, naphthoquinone, phthalocyanine, naphthalocyanine, dimonium, nickeldithiol, and the like, may be used for the colorant absorbing NI radiation. Since the PDP apparatus emits the strong NI radiation extending over a wide wavelength range, the NI radiation-shielding layer absorbing the NI radiation extending over the wide wavelength range may be used.

The antireflection layer 250 according to the present exemplary embodiment is formed on the other surface of the transparent substrate 210, but the present invention is not limited to the above built-up sequence. As illustrated in FIG. 2, it is efficient that the antireflection layer 250 is formed in a surface corresponding to a viewer position when the PDP filter 200 is installed in the PDP apparatus, that is, the opposite surface of the panel assembly. The antireflection layer 250 may enhance visibility by reducing reflection of an external light.

Also, external light reflection of the PDP filter 200 may be further reduced by forming the antireflective layer 250 on a surface in the direction of the panel assembly from main surfaces of the PDP filter 200. Also, the transmittance with respect to visible light from the panel assembly and a contrast ratio may be increased by forming the antireflective layer 250 and reducing external light reflection of the PDP filter 200.

The PDP filter 200 according to the present exemplary embodiment may further include the color correction layer 240 having transmittance greater than or equal to about 60% in a wavelength range of about 580 nm to about 600 nm. The color correction layer 240 modifies or corrects color balance by reducing or controlling an amount of a red color (R), a green color (G), and a blue color (B).

A red visible light generated from plasma in the panel assembly is generally shown as an orange color. A conventional color correction layer generally plays a role of correcting the orange color having the wavelength range of about 580 nm to about 600 nm into the red color. However, the color correction layer 240 according to the exemplary embodiment of the present invention may reduce or exclude the role of correcting the orange color into the red color, due to the transmittance greater than or equal to about 60% with respect to the orange color in the wavelength range of about 580 nm to about 600 nm.

Since the light inherently emitted from plasma and the light that the external light is emitted being reflected from the panel assembly again are the orange color, the orange color is significantly emitted from the panel assembly. The PDP filter 200 according to the present exemplary embodiment may basically reduce an amount of the orange incident light 310 by utilizing the external light-shielding layer 230, and preventing the external light 320 from entering the panel assembly. Accordingly, the PDP filter 200 of the exemplary embodiment may enhance color purity without additionally reducing an amount of the colorant used for correcting the orange color, or using the colorant. For example, when red, green, and blue colors (RGB) are established in middle image gradation (50 IRE) in a bright room (150 lux (lx)), color coordinates are sought with a measuring instrument with respect to each color, and an area ratio of measured color coordinates is sought, compared with an area concerning color coordinates of characteristic colors, it becomes apparent that high color purity may be obtained. The high color purity may be obtained due to an area ratio of about 86%, when measured via the PDP filter 200, compared with a fact that an area ratio of about 66% is obtained, when directly measured in the panel assembly.

The color correction layer 240 uses various colorants in order to increase a range of color reproduction of a display, and enhance distinction of a screen. Dyes or pigments may be used for the colorant. Types of colorants are organic colorants having a neon light shielding function such as anthraquinone, cyanine, azo, stilbene, phthalocyanine, methane, and the like, and the present invention is not limited thereto. Since kinds and concentrations of the colorants are determined by absorption wavelength, absorption coefficients, and transmittance characteristics required for displays, various numerical values may be used without being limited to a specific value.

Also, the PDP filter 200 includes a diffusion layer 280 for preventing a moiré pattern and a Newton's ring. When a periodic pattern such as the light-shielding pattern 236 of the external light-shielding layer 230 or the mesh pattern of the EM radiation-shielding layer 220 is reflected on the front substrate of the panel assembly, a Newton's ring phenomenon may occur in the case where a moiré phenomenon occurs due to mutual interference between an original pattern and a pattern due to reflected light, or a non-uniform distance between the PDP filter 200 and the front substrate of the panel assembly combining with the PDP filter 200. Here, the diffusion layer 280 diffuses the pattern due to reflected light. Accordingly, an interference phenomenon of the original pattern and the pattern due to reflected light does not occur, and the moiré phenomenon and the Newton's ring phenomenon may be prevented. The diffusion layer 280 is preferably formed on the surface of the PDP filter 200 adjacent to the panel assembly. However, the diffusion layer 280 may be disposed on a predetermined location in the PDP filter 200 so that a moiré pattern and a Newton's ring are prevented. Specifically, the diffusion layer 280 may be formed on a surface of the PDP filter 200 toward a viewer, that is, on the antireflective layer 250. Also, the diffusion layer 280 may be directly adhered to the panel assembly, with the external light-shielding layer 230, as described as follows.

The diffusion layer 280 includes a film having an antiglare-processed surface. Here, an antiglare process corresponds to a process of forming a minute concavo-convex structure on a surface of a film using an appropriate method such as a rough surfacing treatment method by sandblasting or embossing, and a transparent corpuscle combination method. A transparent corpuscle in which an average diameter corresponds to about 0.1 μm to about 50 μm, such as a conductive inorganic corpuscle including silica, alumina, titania, zirconia, tin oxide, indium oxide, cadmium oxide, antimony oxide, and the like, and an organic corpuscle including a cross-linked polymer or a non-cross-linked polymer.

When each layer or each film of the PDP filter 200 is stuck together, a transparent gluing agent or adhesive may be used. As a specific material, there are an acrylic adhesive, a silicon adhesive, an urethane adhesive, a polyvinyl butyral adhesive (PMB), an ethylene-vinyl acetate adhesive (EVA), a polyvinyl ether, a saturated amorphous polyester, a melamine resin, and the like.

The PDP filter 200 of the present exemplary embodiment formed similarly to the description above may have the transmittance greater than or equal to about 50% in the visible spectrum, and have the contrast ratio greater than or equal to about 250:1 in a bright room. Also, the diffusion layer 280 having the antiglare-processed surface may efficiently prevent the moiré phenomenon and the Newton's ring phenomenon which may occur by the external light-shielding layer 230 or the EM radiation-shielding layer 220.

Figure 3A:
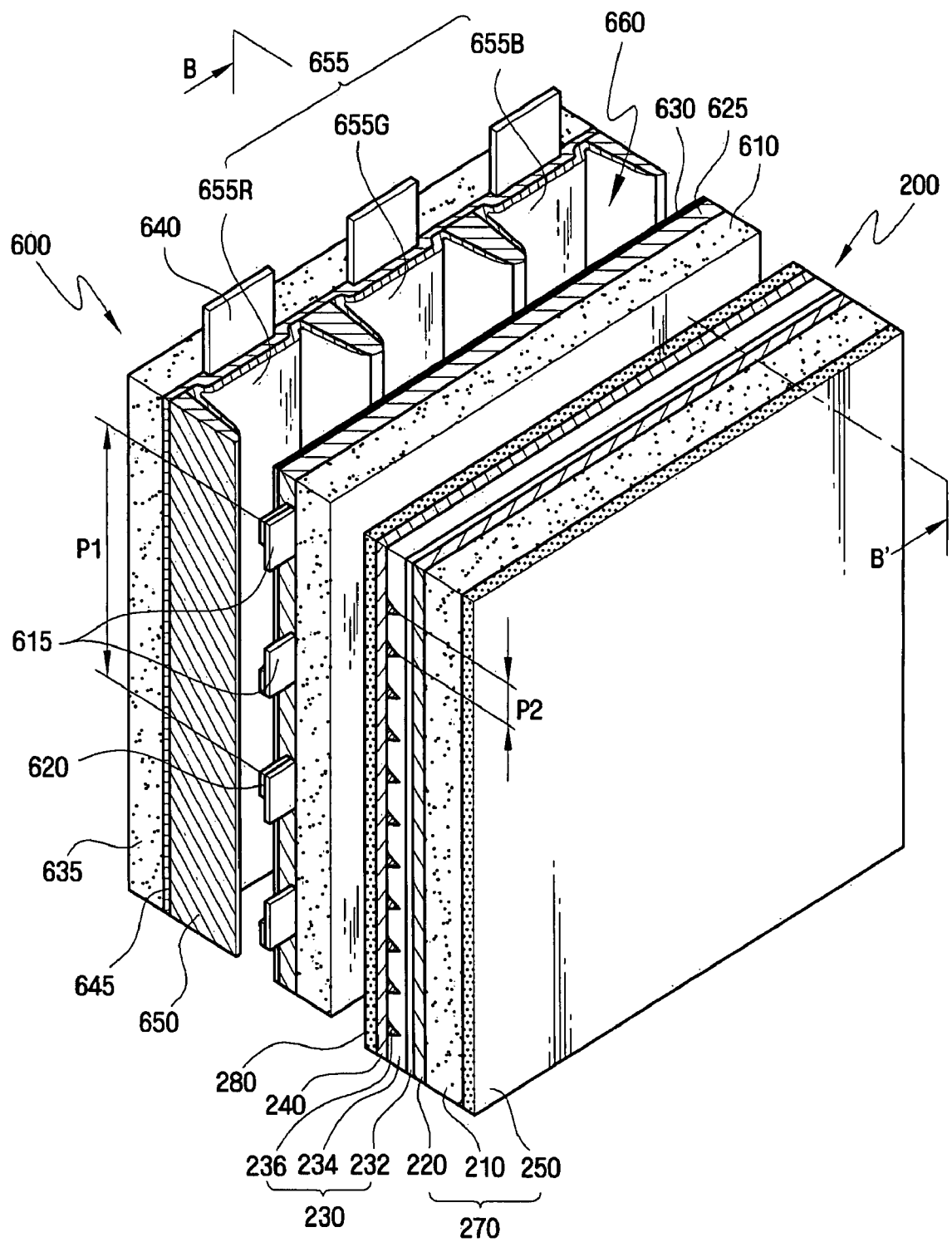
FIG. 3A is an exploded perspective view illustrating a PDP apparatus according to another exemplary embodiment of the present invention.

The PDP filter 200 according to the exemplary embodiment of the present invention is described above. Hereinafter, a PDP apparatus using the PDP filter 200 is described with reference to FIGS. 3A and 3B. FIG. 3A is an exploded perspective view illustrating a PDP apparatus according to an exemplary embodiment of the present invention, and FIG. 3B is a sectional view illustrating a section incised along a line B-B' of FIG. 3A.

Figure 3B:
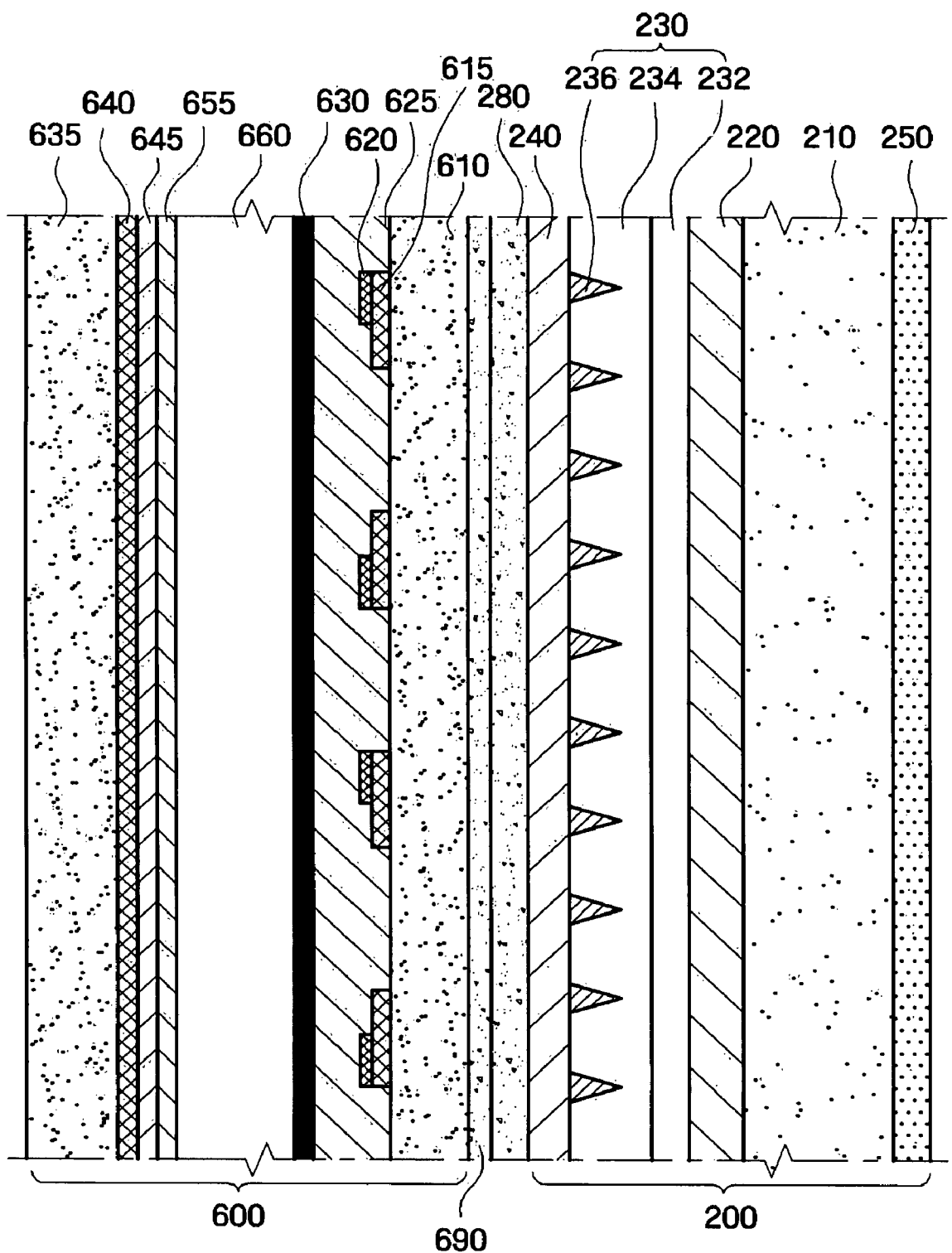
FIG. 3B is a sectional view illustrating a section incised along a line B-B' of FIG. 3A.

As illustrated in FIGS. 3A and 3B, the PDP apparatus according to the present exemplary embodiment includes a PDP filter 200 and a panel assembly 600. The PDP filter 200 is similar to the above-described PDP filter, and hereinafter, the panel assembly is described in detail.

As illustrated in FIG. 3A, a plurality of sustain electrodes 615 is disposed on a surface of a front substrate 610 in the form of stripes. A bus electrode 620 is formed in each sustain electrode 615 to reduce signal delay. A dielectric layer 625 is formed to cover the entire surface where the sustain electrode 615 is disposed. Also, a dielectric shielding film 630 is formed on the surface of the dielectric layer 625. As an example, the dielectric shielding film 630 in the present exemplary embodiment may be formed by covering the surface of the dielectric layer 625 with a thin film of magnesium oxide (MgO) using a sputtering method, and the like.

Also, a plurality of address electrodes 640 is disposed in the form of stripes on a surface of a rear substrate 635 corresponding to a front substrate 610. Disposition direction of the address electrode 640 is substantially in a perpendicular direction to the sustain electrode 615 when the front substrate 610 and the rear substrate 635 are disposed corresponding to each other. The dielectric layer 645 is formed to cover the entire surface where the address electrode 640 is disposed. Also, a plurality of partition walls 650 facing the front substrate 610 in parallel with the address electrode 640 is installed protruding on the surface of the dielectric layer 645. The partition wall 650 is disposed in a range between two adjacent address electrodes 640.

A phosphor layer 655 is disposed on a lateral surface in a groove formed between two adjacent partition walls 650, and the dielectric layer 645. In the phosphor layer 655, a red phosphor layer 655R, a green phosphor layer 655, and a blue phosphor layer 655B are disposed in each groove divided by the partition walls 650. The phosphor layer 655 is a layer formed of a phosphor particle group generated by using a method of generating a thick film such as a screen printing method, an ink-jet method, a photoresist film method, and the like. For example, as material used for the phosphor layer 655, $(Y, Gd)BO_3:Eu$ may be used for a red phosphor, $Zn_2SiO_4:Mn$ may be used for a green phosphor, and $BaMgAl_{10}O_{17}:Eu$ may be used for a blue phosphor.

When the front substrate 610 and the rear substrate 635 having the above structure are disposed corresponding to each other, discharge gas is sealed in a discharge cell 660 generated with the groove and the dielectric shielding film 630. Specifically, the discharge cell 660 is generated in each portion where the sustain electrode 615 between the front substrate 610 and the rear substrate 635, and the address electrode 640 cross in the panel assembly 600. For example, neon-xenon (Ne—Xe) gas, helium-xenon (He—Xe) gas, and the like may be used for the discharge gas.

The panel assembly 600 having the above structure basically has a function of emitting light similar to a fluorescent lamp, and the ultraviolet light emitted from the discharge gas according to internal discharge of the discharge cell 660 is converted into the visible light by exciting the phosphor layer 655 and emitting light.

Also, a phosphor material capable of converting into each different visible light is used for the phosphor layer of each color (655R, 655 and 655B) used for the panel assembly 600. Accordingly, when the image is displayed in the panel assembly 600, color balance is generally controlled by controlling brightness of each phosphor layer (655R, 655G, and 655B). Specifically, brightness of other phosphor layers is reduced at a ratio predetermined for each color, based on the phosphor layer of the lowest color in brightness.

A driving method for the panel assembly 600 is generally divided into a driving method for address discharge and a driving method for sustain discharge. The address discharge occurs between the address electrode 640 and one sustain electrode 615, and wall charge is generated in this instance. The sustain discharge occurs due to a potential difference between two sustain electrodes 615 located in the discharge cell 660 where the wall charge is generated. The phosphor layer 655 of the corresponding discharge cell 660 is excited by the ultraviolet light generated from the discharge gas in the case of sustain discharge, and the visible light is emitted. Also, the visible light is exited via the front substrate 610, and generates the image that the viewer may recognize.

Hereinafter, referring to FIG. 3B, a relation between the panel assembly 600 and the PDP filter 200 is described.

As illustrated in FIG. 3B, the PDP filter 200 is disposed in an upper part of the front substrate 610 of the panel assembly 600. The PDP filter 200 is disposed being spaced apart from the front substrate 610 of the panel assembly 600, or contacting with the front substrate 610, as illustrated in FIG. 3A. Also, the PDP filter 200 and the front substrate 610 may be combined with the adhesive or a gluing agent 690 to prevent undesirable effects such as a foreign substance entering a space between the panel assembly 600 and the PDP filter 200, and the like, or reinforce self-strength of the PDP filter 200, as illustrated in FIG. 3B.

The external light-shielding layer 230 is formed in the PDP filter 200 to prevent the external light from entering the panel assembly 200. The external light is generally absorbed by the external light-shielding layer 230, and therefore it may be prevented that the external light is reflected again passing through the front substrate 610. Accordingly, the contrast ratio of the PDP apparatus may be enhanced in the bright room condition.

A pitch (P2) between the light-shielding patterns 236 is preferably smaller than another pitch (P1) of the discharge cell 660 (or a pixel) formed in the panel assembly 600. Specifically, the incident light may be uniformly dispersed, and the external light may be efficiently absorbed by disposing a plurality of the light-shielding patterns 236 in one discharge cell 660.

Also, the diffusion layer 280 may be formed on the surface of the PDP filter 200. The diffusion layer 280 may disperse incident light from the discharge cell 660 of the panel assembly 600, or reflected light on the front substrate 610 of the panel assembly 600, and prevent light from having a periodic pattern, thereby preventing the moiré phenomenon and the Newton's ring phenomenon.

An exemplary embodiment of the present invention is described above using the external light-shielding layer 230 on which the light-shielding pattern 236 including a wedge-shaped black stripe form is formed, however, the present invention is not limited thereto. An external light-shielding layer in which various light-shielding patterns illustrated in FIGS. 4A through 4H are formed may be used. FIGS. 4A through 4H are perspective views illustrating transformational examples of an external light-shielding layer used for a PDP filter according to an exemplary embodiment of the present invention.

As illustrated in FIGS. 4A through 4E, the external light-shielding layers 430a, 430b, 430c, 430d, and 430e absorb external light using various light-shielding patterns 436a, 436b, 436c, 436d, and 436e, prevent the external light from entering the panel assembly, and totally reflects the incident light from the panel assembly to the viewer. Accordingly, a high transmittance with respect to visible light, and a high contrast ratio may be obtained. The light-shielding pattern having a wedge-shaped black matrix form 436a in FIG. 4A, the light-shielding pattern having a wedge-shaped black wave form 436b in FIG. 4B, the light-shielding pattern having a flat-shaped black stripe form 436c in FIG. 4C, the light-shielding pattern having a flat-shaped black matrix form 436d in FIG. 4D, and the light-shielding pattern having a flat-shaped black wave form 436e in FIG. 4E may correspond to examples of the light-shielding pattern.

Figure 4A:
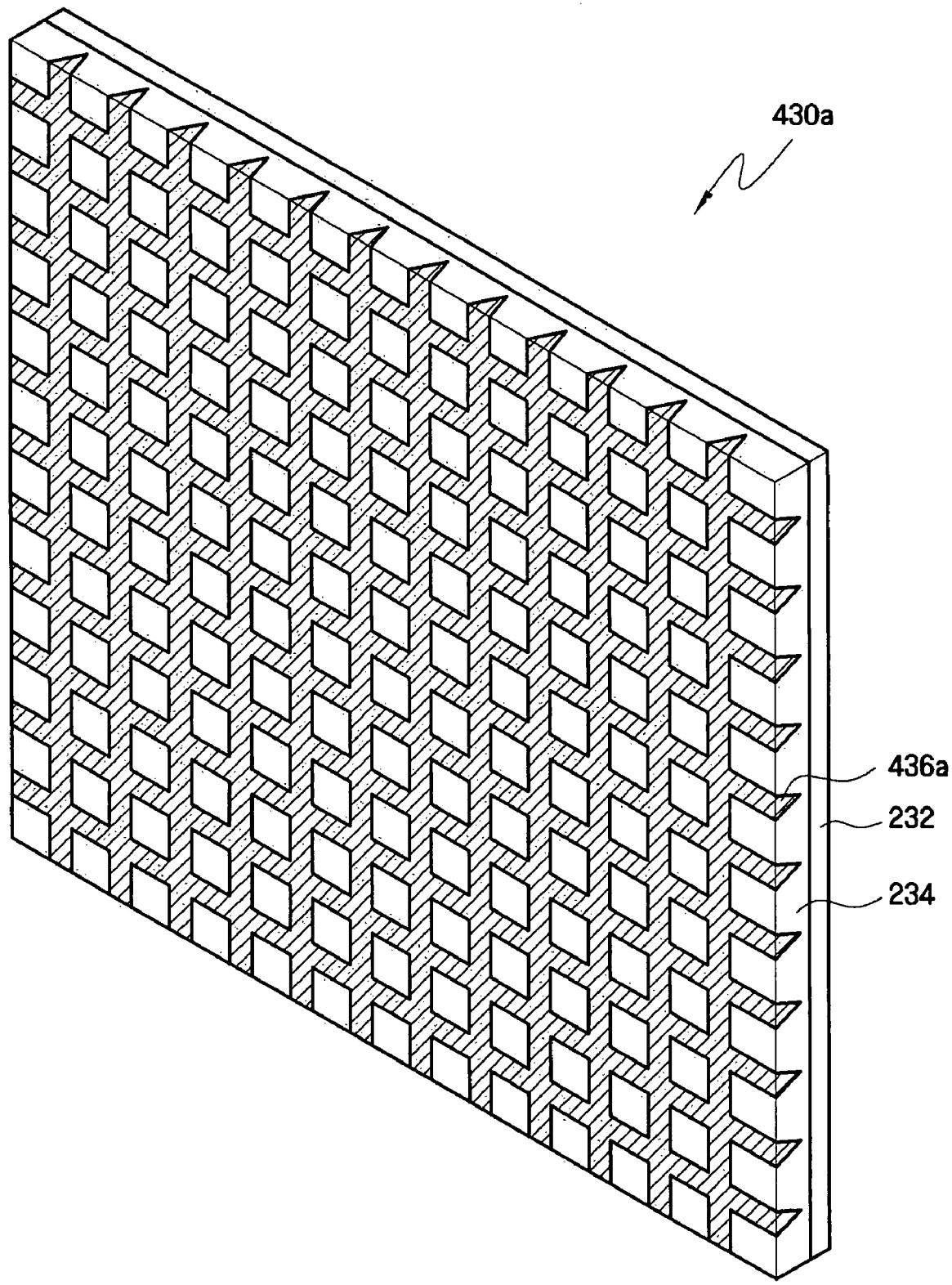
FIGS. 4A through 4H are perspective views illustrating transformational examples of an external light-shielding layer used for a PDP filter according to an exemplary embodiment of the present invention.
Figure 4B:
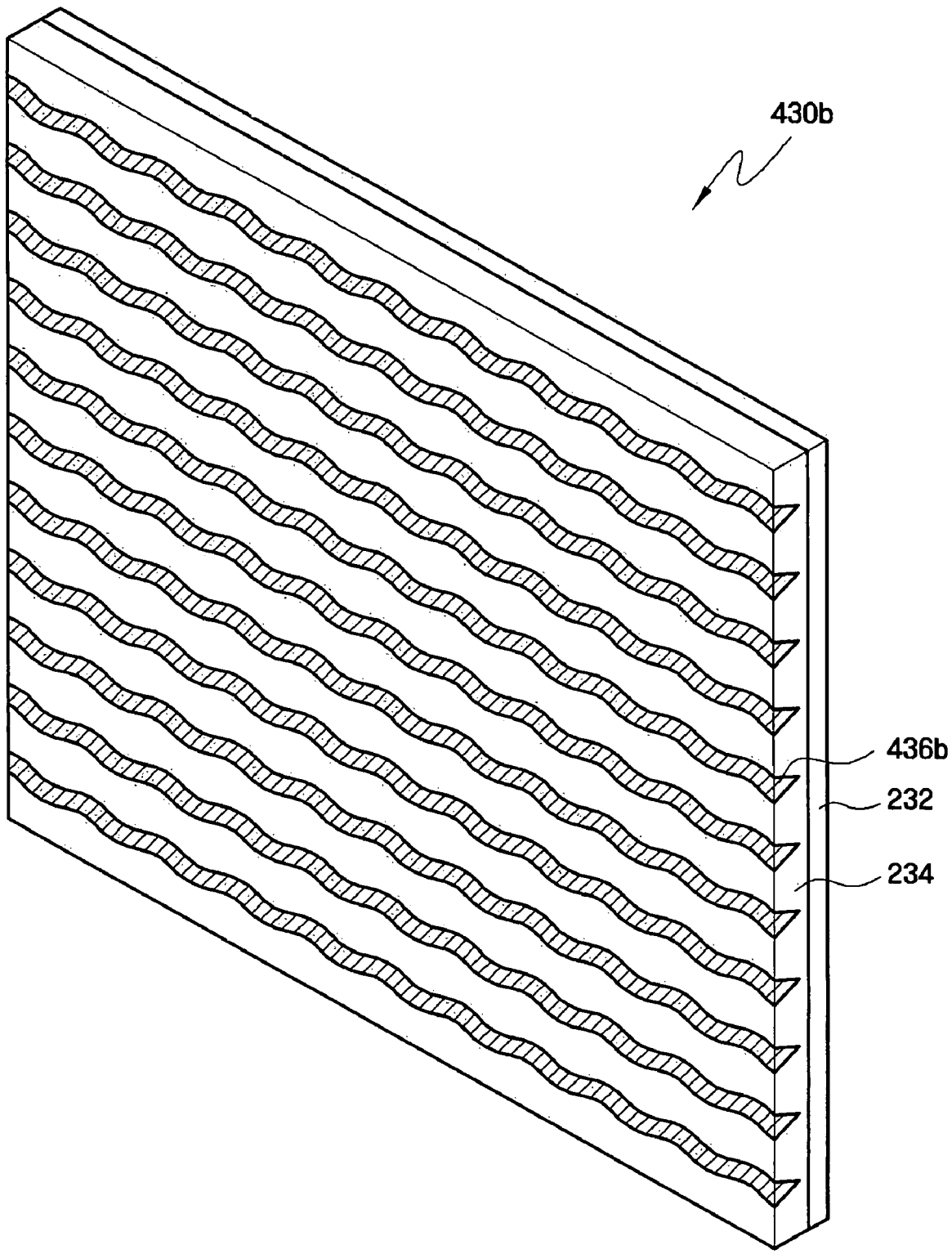
Figure 4C:
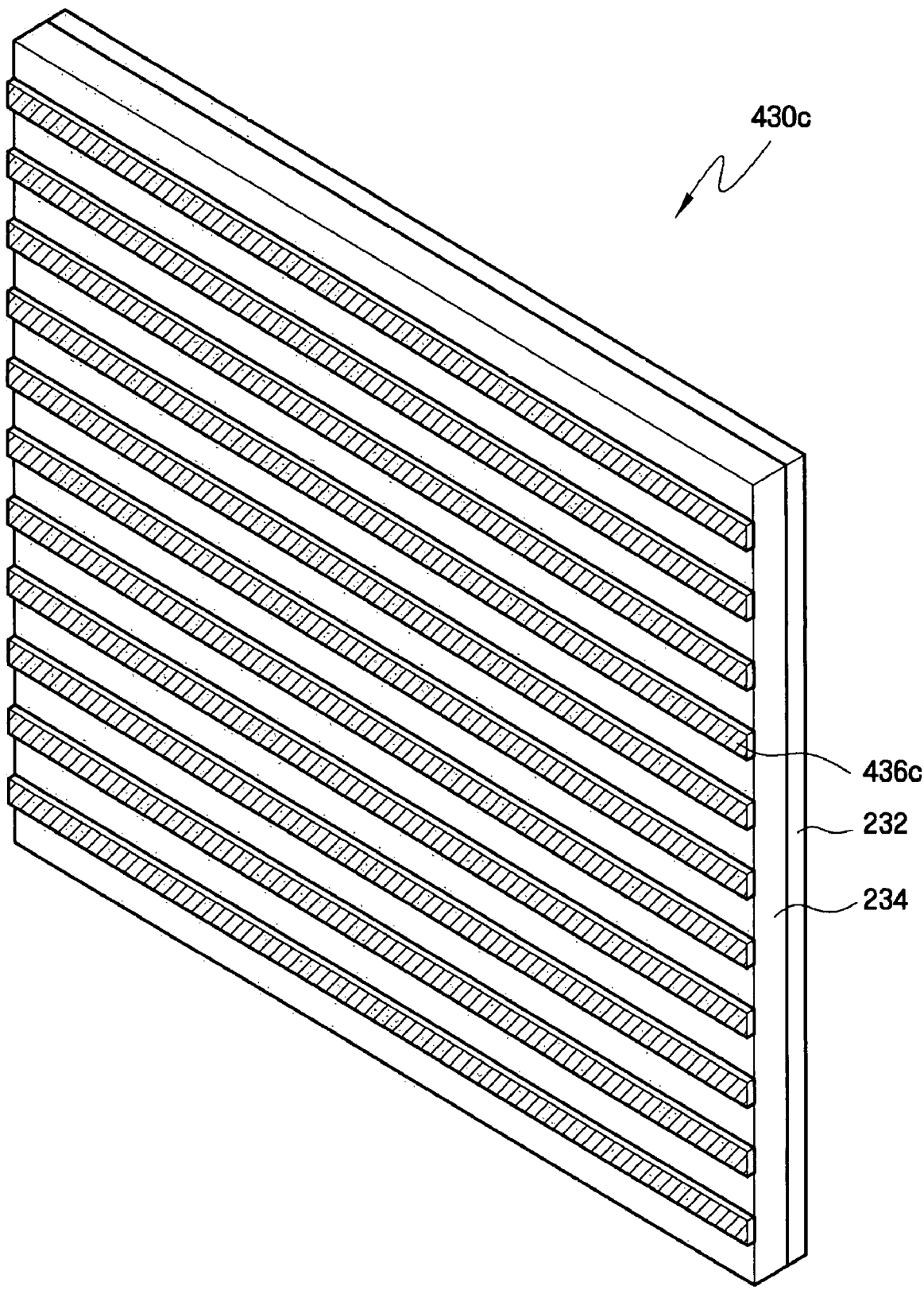
Figure 4D:
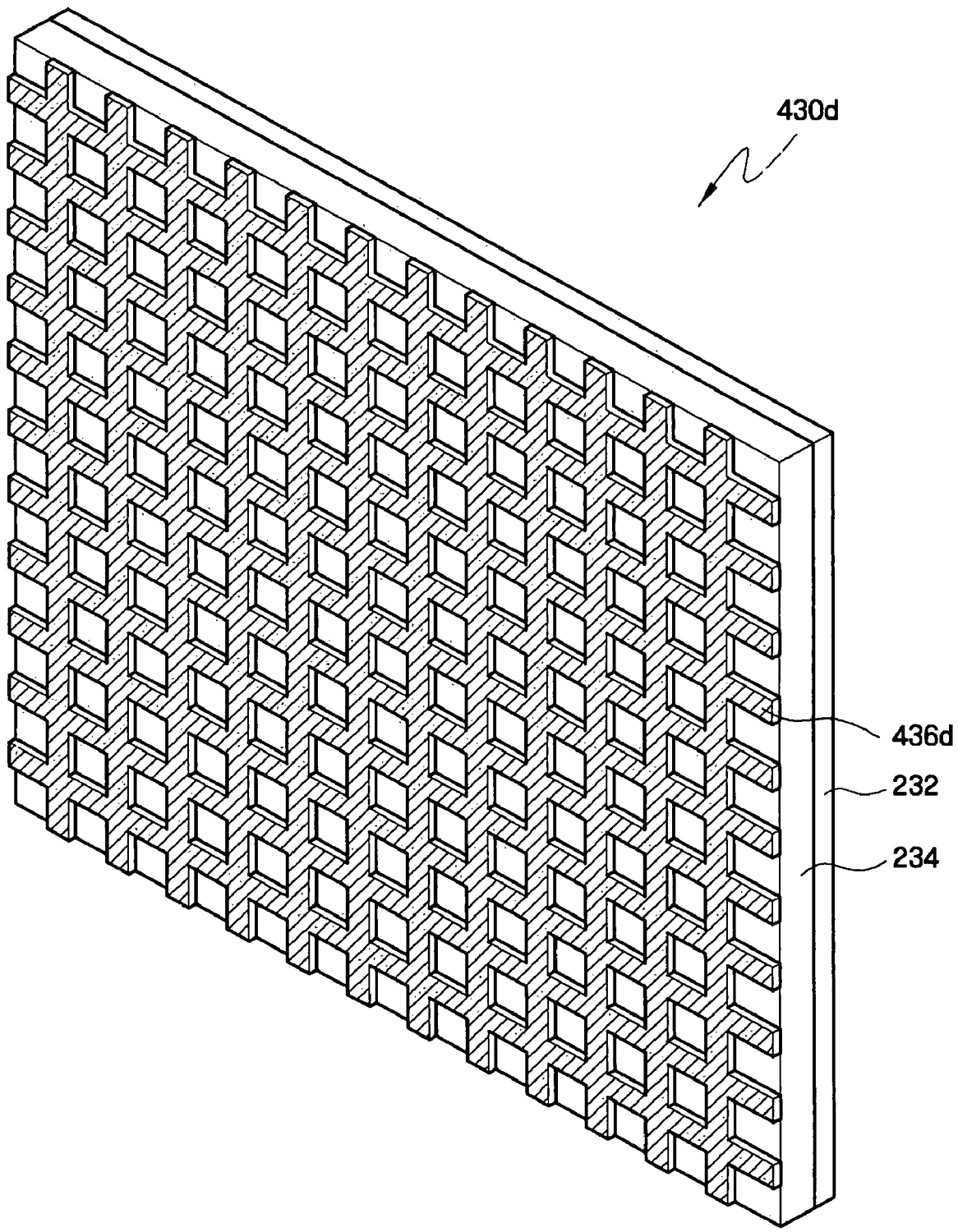
Figure 4E:
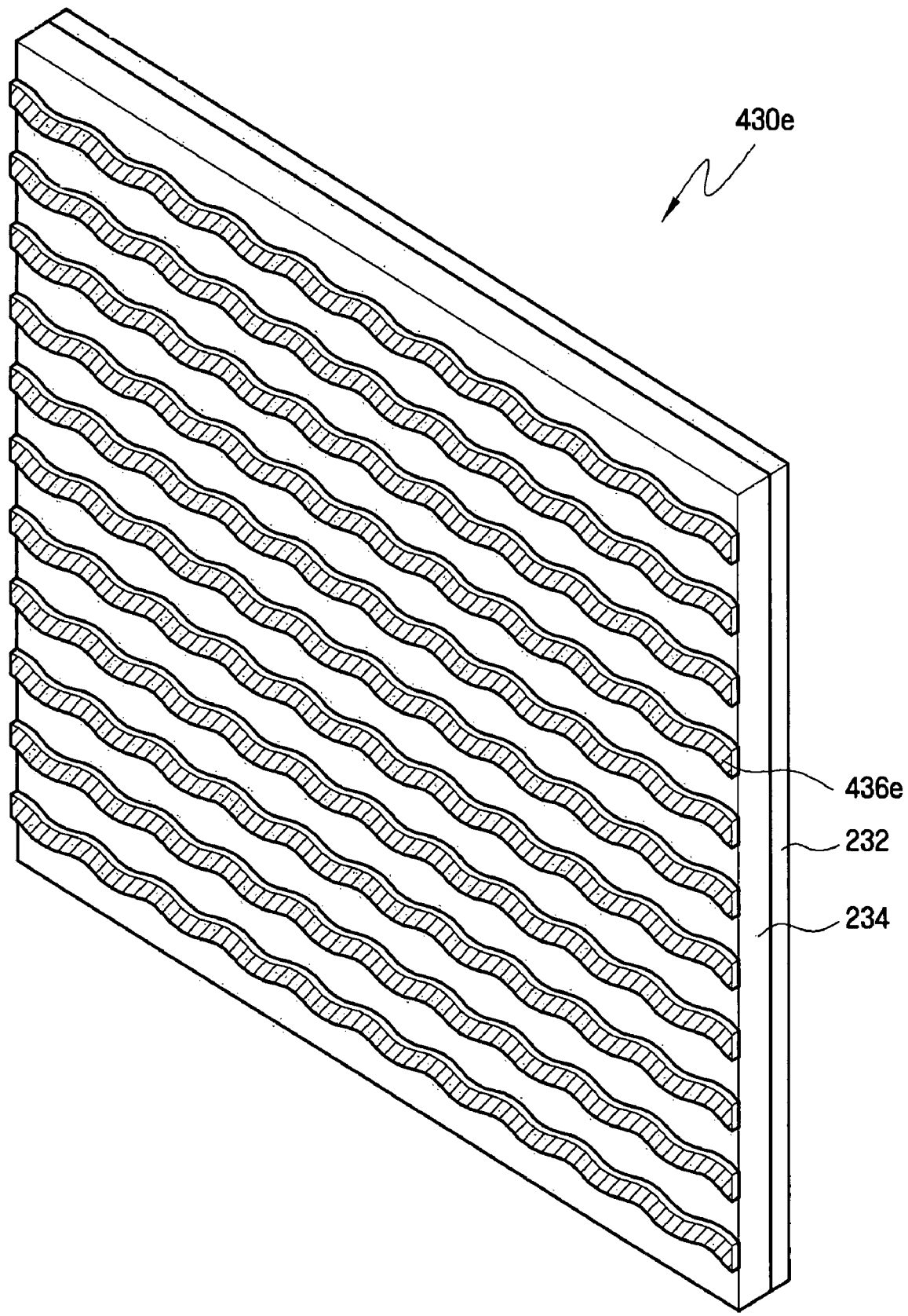
Figure 4F:
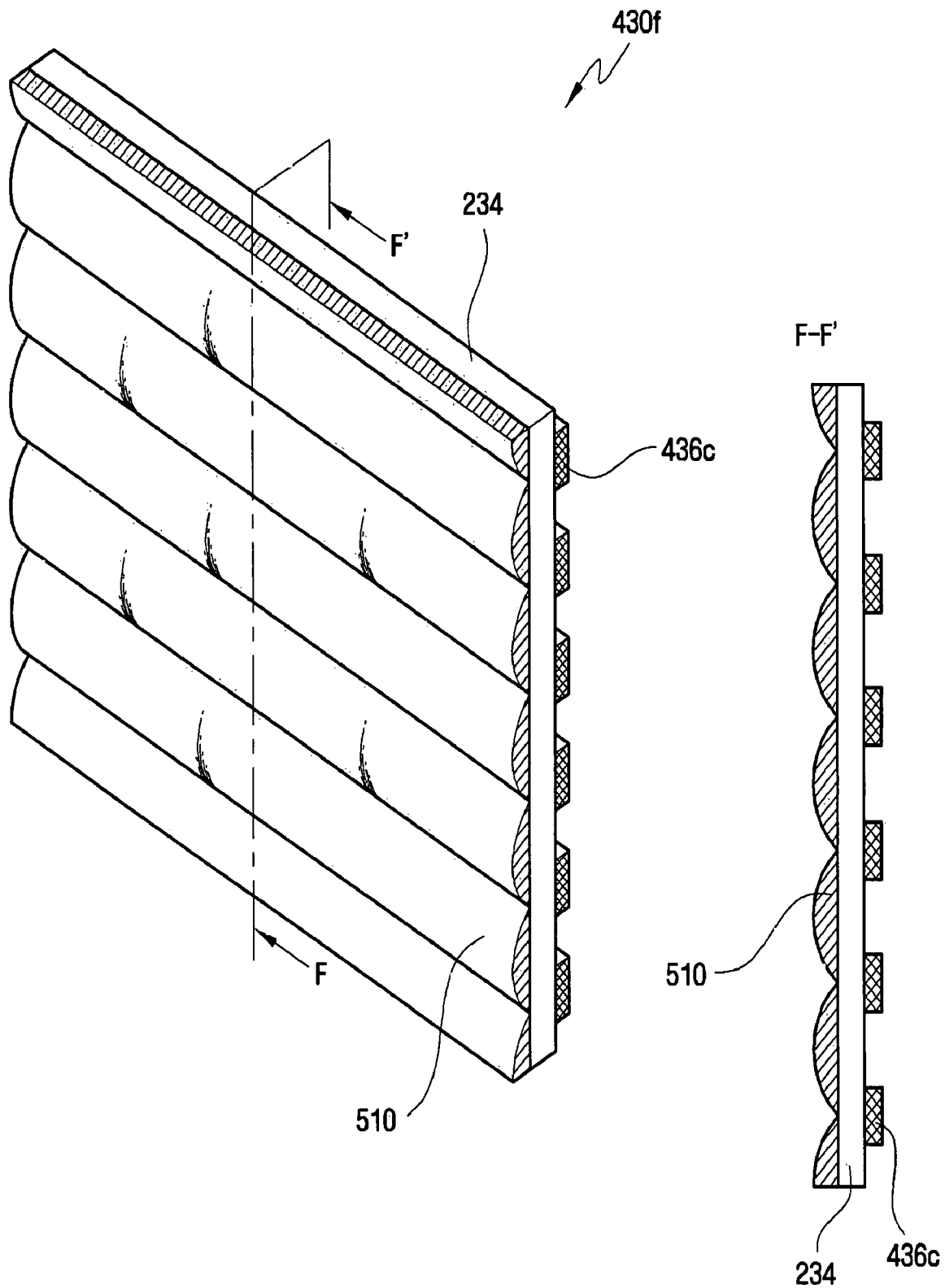
Figure 4G:
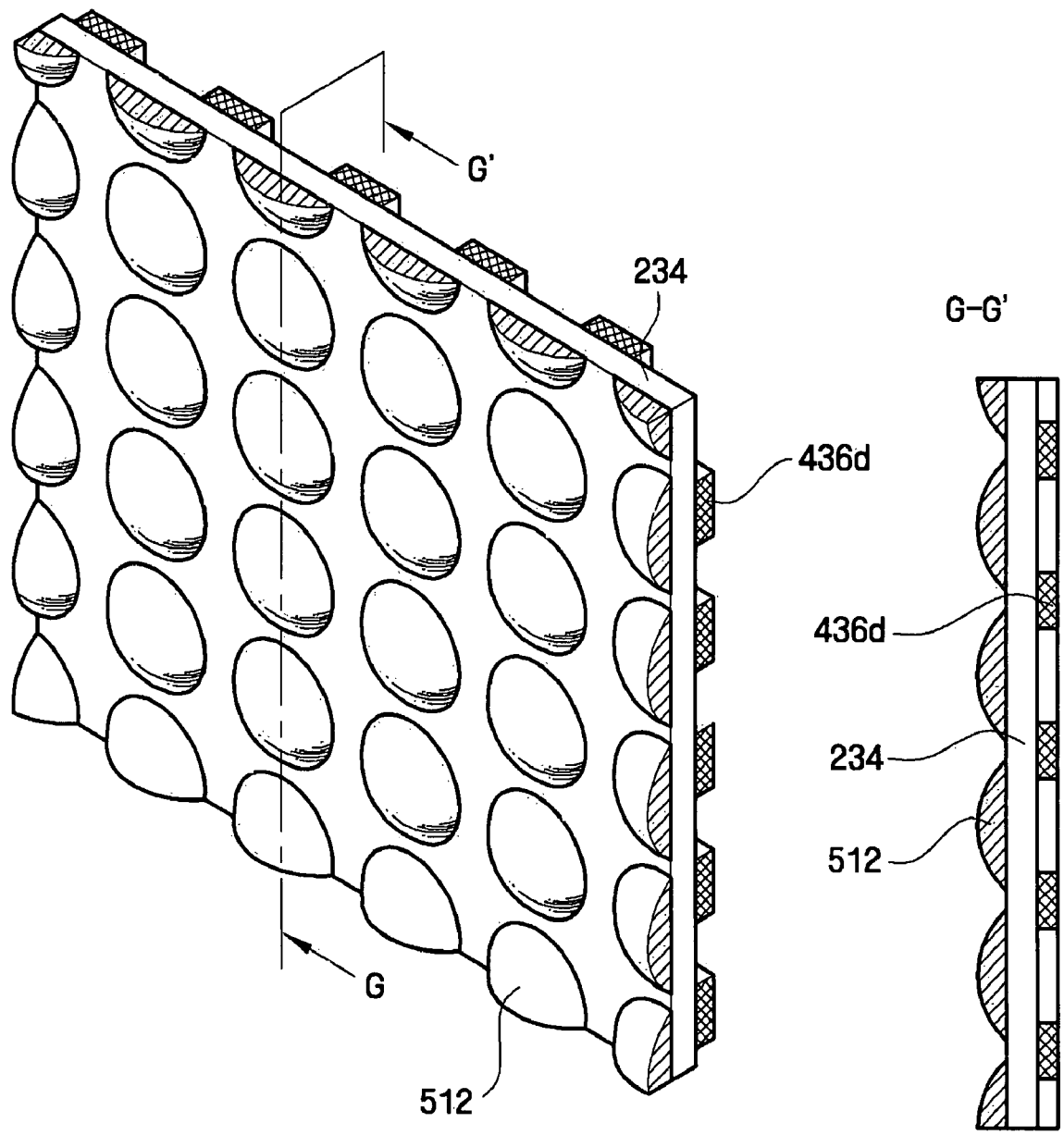
Figure 4H:
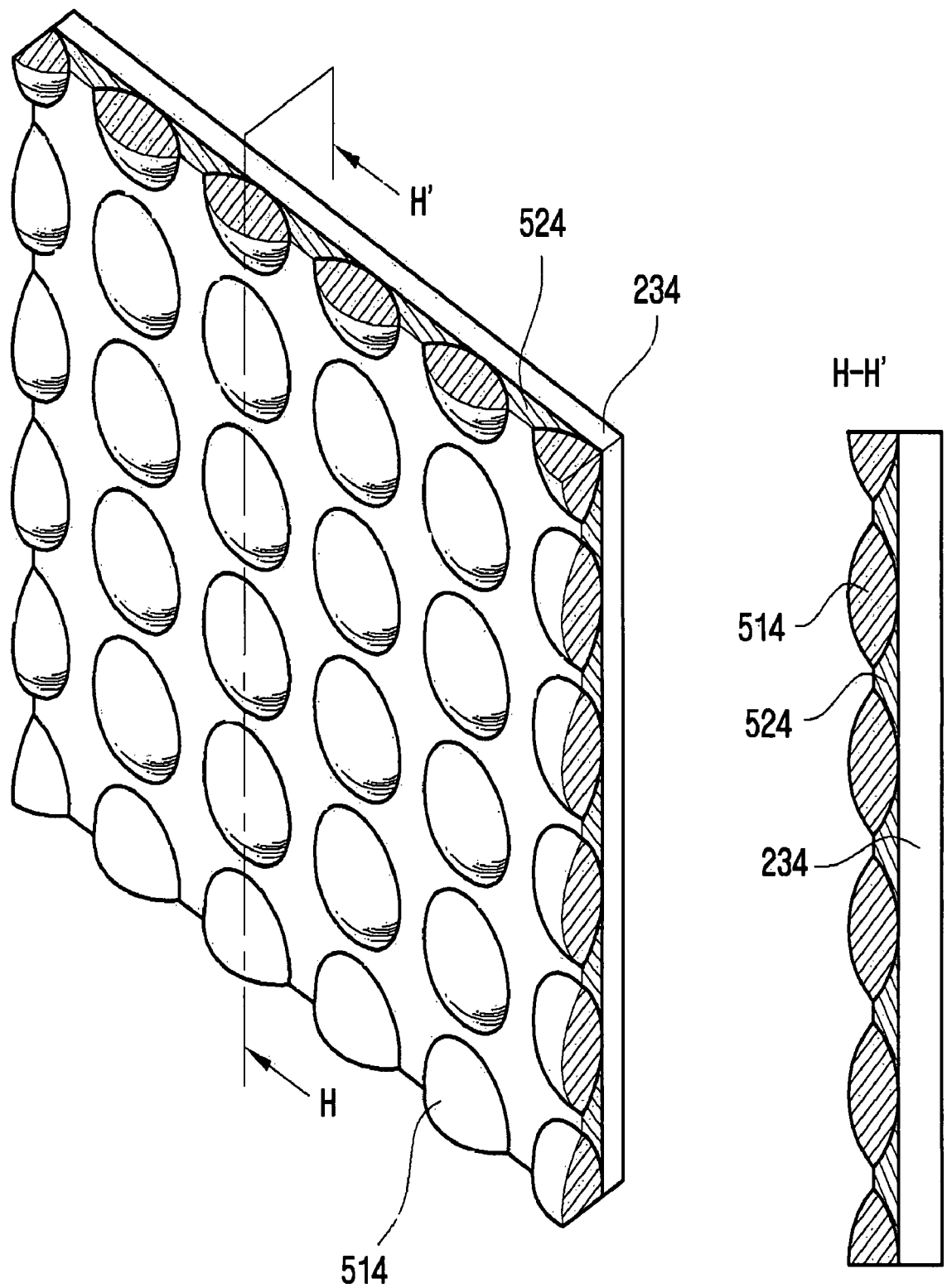

Also, the external light-shielding layers 430f, 430g, and 430h illustrated in FIGS. 4F and 4H shield external light, and simultaneously and efficiently focus incident light from the panel assembly, thereby transmitting incident light to the viewer. Accordingly, a high transmittance with respect to visible light, and a high contrast ratio may be obtained.

Specifically, the external light-shielding layer 430f illustrated in FIG. 4F includes a base substrate 234, a plurality of semicylindrical lenticular lenses 510, and the light-shielding pattern having a flat-shaped black stripe form 436c. The plurality of semicylindrical lenticular lenses 510 is formed on a surface of the base substrate 234, which corresponds to the panel assembly, and focuses incident light. Also, the light-shielding pattern having a flat-shaped black stripe form 436c is formed on another surface of the base substrate 234, and shields external light. The external light-shielding layer 430g illustrated in FIG. 4G includes a base substrate 234, a plurality of semispherical lenticular lenses 512, and the light-shielding pattern having a flat-shaped black matrix form 436d. The plurality of semispherical lenticular lenses 512 is formed on a surface of the base substrate 234, which corresponds to the panel assembly, and focuses incident light. Also, the light-shielding pattern having a flat-shaped black matrix form 436d is formed on another surface of the base substrate 234, and shields external light. Also, the external light-shielding layer 430h illustrated in FIG. 4H includes a base substrate 234, a plurality of bead-typed lens 514 including an oval surface, and a light-shielding pattern 524. The plurality of bead-typed lens 514 is formed on a surface of the base substrate 234, and focuses incident light. Also, the light-shielding pattern 524 fills a space between the base substrate 234 and the bead-typed lens 514, and shields external light.

Here, the light-shielding pattern 524 in FIG. 4H includes the same material as the material of the light-shielding pattern 236 in FIG. 2, and performs the same function. The light-shielding pattern 524 also includes a periodic pattern by the regularly-arranged bead-typed lens 514. Also, the lenticular lenses 510 and 512, and the bead-typed lens 514 may include a transparent material having a high light transmittance, for example, a light transmittance greater than or equal to about 70%. For example, the lenticular lenses 510 and 512, and the bead-typed lens 514 may be formed by glass or a transparent resin, or include an absorbent for absorbing neon light and/or NI radiation.

Figure 5:
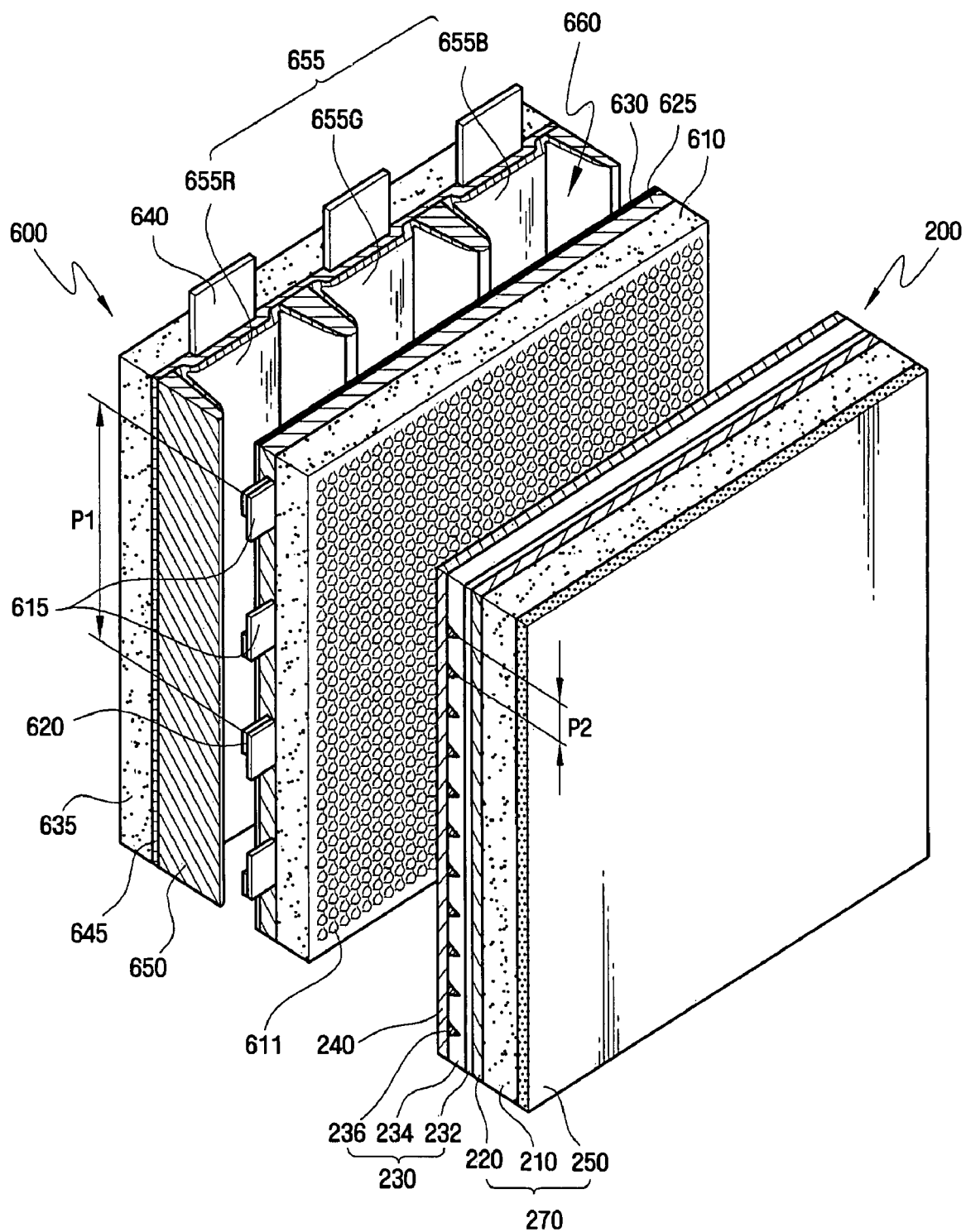
FIG. 5 is an exploded perspective view illustrating a PDP apparatus according to still another exemplary embodiment of the present invention.

Hereinafter, a PDP apparatus according to still another exemplary embodiment of the present invention is described referring to FIG. 5. FIG. 5 is an exploded perspective view illustrating a PDP apparatus according to still another exemplary embodiment of the present invention. Identical reference numerals refer to elements having the same function as each element in FIGS. 1 through 3B, for convenience of description. Accordingly, a description related thereto is omitted. As illustrated in FIG. 5, the PDP apparatus of the present exemplary embodiment of the present invention basically includes the same structure as the PDP apparatuses of the exemplary embodiments of the present invention described with respect to FIGS. 1 through 3B, excluding a description as follows.

Specifically, the front substrate 610 of the panel assembly 600 may be antiglare-processed instead of forming the diffusion layer 280 in the PDP filter to prevent the moiré phenomenon and the Newton's ring phenomenon, as illustrated in FIG. 5. Specifically, a diffused reflection surface 611 of the front substrate 610, which corresponds to the PDP filter 200, is an antiglare-processed surface, and prevents an interference phenomenon by diffusedly reflecting reflected light so that reflected light on the front substrate 610 may exclude a predetermined pattern. Accordingly, the moiré phenomenon and the Newton's ring phenomenon may be prevented. Also, the PDP filter including the diffusion layer described in the above-described exemplary embodiments may be applied to the PDP apparatus of the present exemplary embodiment of the present invention.

A display filter and a display apparatus including the display filter according to the above-described exemplary embodiments of the present invention may form light-shielding patterns in the display filter, thereby increasing brightness and a contrast ratio of the display apparatus. Also, the moiré phenomenon and the Newton's ring phenomenon may be efficiently prevented controlling an interference phenomenon of light by an antiglare process.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A display filter comprising:
    a filter base;
    an external light-shielding layer comprising a base substrate including a transparent resin and light-shielding patterns spaced apart on a surface of the base substrate at predetermined intervals; and
    a diffusion layer diffusing a light provided from a panel assembly, wherein
    an area ratio of bottom surfaces of the light-shielding patterns to the surface of the base substrate corresponds to about 20% to about 50%,
    discharge cells are formed in the panel assembly,
    a pixel pitch of the panel assembly is greater than a pitch of a mesh pattern, and
    the pitch of the mesh pattern is greater than a pitch of the light-shielding pattern.

2. The display filter of claim 1, wherein the diffusion layer comprises a film including an antiglare-processed surface.

3. The display filter of claim 1, wherein the display filter is located corresponding to the panel assembly including a plurality of discharge cells, and
    a pixel pitch of the panel assembly ranges from about 0.5 mm to about 2.5 mm, a pitch of the light-shielding pattern ranges from about 0.07 mm to about 0.11 mm, and a pitch of the mesh pattern ranges from about 0.25 mm to about 0.35 mm.

4. The display filter of claim 1, wherein the diffusion layer formed between the light-shielding layer and the filter base.

5. The display filter of claim 1, wherein the diffusion layer formed at opposite side of the filter base with respect to the light shielding-layer.

6. The display filter of claim 1, wherein the diffusion layer faces the panel assembly.

7. The display filter of claim 1, wherein the light-shielding pattern corresponds to any one of a wedge-shaped black stripe form, a wedge-shaped black matrix form, a wedge-shaped black wave form, a flat-shaped black stripe form, a flat-shaped black matrix form, and a flat-shaped black wave form.

8. The display filter of claim 1, further comprising:
    any one of a semicylindrical lenticular lens and a semispherical lenticular lens, being located between the light-shielding patterns on the base substrate, and concentrating light.

9. The display filter of claim 1, further comprising:
a bead-typed lens arranged on a surface of the base substrate,
wherein the light-shielding pattern fills a space between the base substrate and the bead-typed lens.

10. The display filter of claim 1, wherein the light-shielding pattern includes a black inorganic/organic matter, and a metal.

11. A display apparatus comprising:
a panel assembly comprising a transparent front substrate and a rear substrate being coupled corresponding to each other, and a plurality of cells between the front substrate and the rear substrate; and
the display filter of claim 1 located corresponding to the front substrate of the panel assembly.

12. A display apparatus comprising:
a panel assembly comprising a transparent front substrate and a rear substrate being coupled corresponding to each other and a plurality of cells between the front substrate and the rear substrate; and
the display filter of claim 1 located corresponding to the front substrate of the panel assembly,
wherein a surface of the front substrate corresponding to the display filter is an antiglare-processed surface.

* * * * *